United States Patent Office 3,371,057
Patented Feb. 27, 1968

3,371,057
COATING COMPOSITION OF IMPROVED "SLIP" CHARACTERISTICS
Arnold L. Guttman, Chicago, Ill., assignor to Sinclair Research, Inc., New York, N.Y., a corporation of Delaware
No Drawing. Filed Sept. 27, 1965, Ser. No. 490,727
3 Claims. (Cl. 260—28.5)

ABSTRACT OF THE DISCLOSURE

A wax composition useful, e.g., for coating and treating paper materials and containing about 25 to 80 weight percent of crystalline paraffin wax having a melting point of about 120–160° F., about 15 to 45 weight percent of an ethylene-vinyl acetate copolymer having a polymerized vinyl acetate content of about 20 to 35 weight percent, and small amounts of octadecenamide (e.g., 9-octadecenamide) and N,N'-dioleylethylenediamine. The composition may further contain up to about 35 weight percent microcrystalline wax having a melting point of about 160–180° F.

---

This invention relates to novel petroleum wax-containing compositions characterized by superior "slip" characteristics.

Paraffin waxes have found extensive use as coating and treating materials for paper cartons, dairy applications and similar uses. In the majority of applications various additives are incorporated in the waxes to impart or improve particular properties. For example, an important property, especially in wax compositions applied to paper cartons, is low friction or good "slip." Paper cartons such as are used for the packaging of bacon, butter, margarine and a variety of frozen foods are made, processed and handled on modern high speed machinery and good "slip" properties are required to prevent jamming of the cartons. Slipperiness, or ability to slide readily when in contact with other surfaces must be present as soon as the coated blank leaves the waxing machine (initial "slip") and it must persist until all the manufacturing and machine handling operations are completed (aged "slip").

Unfortunately many of the additives incorporated into paraffin wax compositions to improve slip are not entirely satisfactory in that they either destroy or adversely effect other desired properties such as heat-sealability, gloss, blocking point and scuff resistance or do not provide aged "slip."

I have now found a wax composition that not only possesses excellent initial and aged "silp" properties but also the other aforementioned desired properties. The composition of the invention consists essentially of about 25 to 80%, preferably about 35 to 70% crystalline paraffin wax; 0 to about 35%, preferably about 10 to 35% microcrystalline wax; about 15 to 45%, preferably about 30 to 40% of an ethylene-vinyl acetate copolymer, about 0.1 to 1%, preferably obout 0.25 to 0.35% of octadecenamide and about 0.1 to 0.4%, preferably about .04 to 0.2% N,N-dioleylethylenediamine. All of the above percentages are by weight.

The crystalline paraffin wax component of the instant composition includes crystalline paraffin waxes in general, obtained, for instance, by conventional processing of waxy distillates from paraffin base crude oils, such as Pennsylvania crude or mixed base crudes. Generally, the paraffin waxes will have a melting point of about 120 to 160° F., and often, a maximum oil content (ASTM D–721–55T) of about 1 percent, and may be a fully or a semi-refined wax. The preferred paraffin wax is characterized by having typically, a melting point of about 140 to 160° F., (ASTM D–87), a viscosity of about 39 to 50 SUS at 210° F., (ASTM D–88) and a needle penetration at 100° F., of about 10 to 40 (ASTM D–1321). The paraffin wax component of the invention can be single paraffin wax or a blend of separately prepared paraffinnic waxes.

The ethylene-vinyl acetate copolymer component of the invention is of the general type described in U.S. Patents Nos. 2,877,196; 2,490,550 and 2,200,429. Suitable ethylene-vinyl acetate copolymers are those having a polymerized vinyl acetate content of about 20 to 35 weight percent. Although the copolymer is comprised essentially of vinyl acetate and ethylene, minor amounts of other nondeleterious components might be present in the polymer. The molecular weight of the copolymer, as indicated by "melt index" can vary over a rather wide range and the copolymer may have a melt index of about 1 to 500, preferably at least about 50.

It is preferred, although not essential, to include in the wax composition of the invention minor amounts of microcrystalline wax as an optional component. Suitable microcrystalline waxes are characterized by having, typically, a melting point of about 160° to 180° F. (ASTM D–127), a refractive index at 80° C., of at least about 1.445, a viscosity of about 75 to 100 SUS at 210° F., (ASTM D–88) and a needle penetration at 100° F., of about 20 to 50 (ASTM D–1321). The microcrystalline wax component can be obtained by conventional methods from waxy petroleum distillation residues, such residues being largely non-boiling at 1050° F., or by blending separately prepared microcrystalline waxes such that the desired properties are obtained.

The actual concentration of each of octadecenamide and N,N'-dioleylethylenediamine employed in the wax composition of the invention may vary depending upon the particular crystalline paraffin wax selected and whether or not a microcrystalline wax is employed. It is important, however, that the concentration of N,N'-dioleylethylenediamine not be in excess of about 0.4% by weight since such concentrations have been found to destroy heat sealability. The compositions of the invention can, if desired, contain minor amounts or other ingredients such as oxidation inhibitors, etc., as long as the desired properties of the composition are not unduly deleteriously affected.

The following examples are included to further illustrate the present invention.

*Examples 1 through 17*

The wax compositions identified in Table I below were each evaluated from the standpoint of "slip" properties as measured by the coefficient of friction and from the standpoint of ability to form a fiber-tearing bond under suitable heat-sealing conditions. The results which are summarized in Table I below were obtained on smooth high gloss coatings applied to folding paperboard stock.

TABLE I

| Example No. | Base Wax [2] | 9-octadecenamide, plus wt. percent | N,N'-dioleylethylenediamine, plus wt. percent | Coefficient [1] of friction Initial [3] | Coefficient [1] of friction Aged [4] | Fiber Tearing Heat-Seal Bond |
|---|---|---|---|---|---|---|
| 1 | A | | | 1.4 | 1.4 | Complete. |
| 2 | A | 0.5 | | 0.2 | 1.4 | Do. |
| 3 | A | | 0.5 | 1.4 | 0.2 | None. |
| 4 | A | | 1.0 | 1.1 | 0.2 | Do. |
| 5 | A | 0.5 | 0.5 | 0.2 | 0.2 | Do. |
| 6 | A | 0.5 | 0.2 | 0.2 | 0.2 | Partial. |
| 7 | A | 0.5 | 0.1 | 0.2 | 0.3 | Do. |
| 8 | A | 0.5 | 0.05 | 0.2 | 0.3 | Do. |
| 9 | A | 0.5 | 0.02 | 0.2 | 1.4 | Complete. |
| 10 | A | 0.3 | 0.1 | 0.5 | 0.2 | Do. |
| 11 | A | 0.3 | 0.05 | 0.5 | 0.2 | Do. |
| 12 | A | 0.3 | 0.02 | 0.5 | 1.4 | Do. |
| 13 | A | 0.25 | 0.25 | 0.3 | 0.2 | Partial. |
| 14 | A | 0.2 | 0.1 | 0.6 | 0.25 | Complete. |
| 15 | B | 0.3 | 0.05 | 0.4 | 0.2 | Do. |
| 16 | C | 0.3 | 0.05 | 0.5 | 0.2 | Do. |
| 17 | D | 0.3 | 0.05 | 0.5 | 0.25 | Do. |

[1] The coefficient of friction was measured between waxed surfaces of paperboard while one was sliding over the other at 20 in./min. rate.
[2] Components of Base Wax, wt. percent:
    152/154° F., ASTM Paraffin Wax—A 42; B 65.
    142/144° F., ASTM Paraffin Wax—C 42; D 65.
    Microwax 171° F., m.p.—A 23; C 23.
    Ethylene-Vinyl Acetate Copolymer 200–400 melt index, containing approx. 28% Vinyl Acetate.—A 35; B 35; C 35; D 35.
    Butylated hydroxy toluene (an antioxidant)—$A+0.02$; $B+0.02$; $C+0.02$; $D+0.02$.
[3] Measured immediately after coating with wax.
[4] Measured 3–4 weeks after coating.

Example 1 shows that without either 9-octadecenamide or N,N'dioleylethylene-diamine the coefficients of friction of the wax composition exceeds unity. Commercial experience with folding carton handling suggests that for trouble-free operation the coefficient of friction should not be higher than about 0.5.

Examples 2, 3 and 4 illustrate the affects when either the 9-octadecenamide or the N,N'-dioleylethylene diamine is used alone. The former yields excellent initial "slip" and does not impair the heat-sealability but the "slip" is fugitive. The latter gives excellent aged "slip" but no initial "slip" and it destroys heat-sealability.

Examples 5 through 14 show the results of combining 9-octadecenamide and N,N'-dioleylethylenediamine in various concentrations in Base Wax A. The best blends, represented by Examples 10 and 11, contained 0.3% octadecenamide and 0.05 to 0.1% N,N'-dioleylethylene-diamine, and gave good initial "slip," excellent aged "slip" and maintained a fiber-tearing heat-seal bond. The preferred composition is Example 11 because it is least likely to cause heat seal problems and it is the more economical of the two preferred blends.

Examples 15, 16 and 17 demonstrate that the petroleum wax components can be varied through a broad spectrum without having an appreciable influence on the initial and aged "slip" properties.

What is claimed is:

1. A wax composition consisting essentially of about 25 to 80% by weight crystalline paraffin wax having a melting point of about 120–160° F., 0 to about 35% by weight microcrystalline wax having a melting point of about 160–180° F., about 15 to 45% by weight of ethylenevinyl acetate copolymer having a polymerized vinyl acetate content of about 20 to 35 weight percent, about 0.1 to 1% by weight octadecenamide and about 0.04 to 0.2% by weight N,N'-dioleylethylenediamine.

2. The composition of claim 1 wherein the octadecenamide is 9-octadecenamide.

3. A wax composition consisting essentially of about 35 to 70% by weight crystalline paraffin wax, having a melting point of about 120 to 160° F., about 10 to 35% by weight microcrystalline wax, having a melting point of about 160 to 180° F., about 30 to 40% by weight ethylenevinyl acetate copolymer having a polymerized vinyl acetate content of about 20 to 35 weight percent, about 0.25 to .35% by weight 9-octadecenamide, and about .04 to 0.2% by weight and N,N'-dioleylethylenediamine.

References Cited

UNITED STATES PATENTS

| | | | |
|---|---|---|---|
| 2,803,612 | 8/1957 | Moyer | 260—32.6 |
| 2,770,609 | 11/1956 | Symonds | 260—32.6 |
| 2,938,879 | 5/1960 | Mock | 260—32.6 |
| 2,891,027 | 6/1959 | Coler | 260—32.6 |
| 3,175,986 | 3/1965 | Apikos. | |
| 3,321,427 | 5/1967 | Tyran. | |
| 3,245,931 | 4/1966 | Matthew. | |
| 3,306,882 | 2/1967 | Pullen. | |
| 2,808,612 | 8/1957 | Moyer. | |
| 3,142,401 | 8/1964 | Foss | 260—285 |

JULIUS FROME, *Primary Examiner.*